US006799577B2

(12) United States Patent
Bergo et al.

(10) Patent No.: US 6,799,577 B2
(45) Date of Patent: Oct. 5, 2004

(54) AUTOMATIC CIGARETTE PROCESSING MACHINE

(75) Inventors: Daniele Bergo, Bologna (IT); Roberto Campanini, Bologna (IT); Mario Spatafora, Bologna (IT)

(73) Assignee: G. D Societa' per Azioni, Bologna (IT)

( * ) Notice: Subject to any disclaimer, the term of this patent is extended or adjusted under 35 U.S.C. 154(b) by 0 days.

(21) Appl. No.: 09/969,213

(22) Filed: Oct. 2, 2001

(65) Prior Publication Data

US 2002/0077709 A1 Jun. 20, 2002

(30) Foreign Application Priority Data

Oct. 3, 2000 (IT) .................................... BO2000A0577

(51) Int. Cl.[7] ............................. A24C 1/14; A24C 1/44; A24C 5/33; A24C 5/35
(52) U.S. Cl. ...................... 131/283; 131/282; 700/117
(58) Field of Search .............................. 700/96, 117, 9, 700/10; 131/280, 282, 283

(56) References Cited

U.S. PATENT DOCUMENTS

| | | | | |
|---|---|---|---|---|
| 4,441,302 A | * | 4/1984 | Gabbitas et al. | ........... 131/84.1 |
| 4,463,766 A | * | 8/1984 | Arthur et al. | ................... 53/52 |
| 4,599,699 A | * | 7/1986 | Stewart-Cox et al. | ........ 702/185 |
| 4,724,429 A | * | 2/1988 | Millen et al. | ................. 340/679 |
| 4,827,423 A | * | 5/1989 | Beasley et al. | ................ 700/96 |
| 5,068,778 A | * | 11/1991 | Kosem et al. | ................... 700/9 |
| 5,231,585 A | | 7/1993 | Kobayashi et al. | |
| 5,524,414 A | * | 6/1996 | Spada et al. | ..................... 53/54 |
| 5,706,627 A | | 1/1998 | Kirka et al. | |
| 5,748,939 A | | 5/1998 | Rozman et al. | |
| 5,787,002 A | | 7/1998 | Iwamoto et al. | ........ 364/468.22 |
| 5,966,897 A | * | 10/1999 | Kirka et al. | .................... 53/55 |
| 5,978,578 A | * | 11/1999 | Azarya et al. | .............. 717/100 |
| 6,021,782 A | * | 2/2000 | Seymour et al. | ............. 131/280 |
| 6,631,301 B2 | * | 10/2003 | Focke et al. | ................... 700/56 |

FOREIGN PATENT DOCUMENTS

| | | | |
|---|---|---|---|
| DE | 4217473 A | 12/1992 | |
| WO | WO 00/16647 | 3/2000 | ............. A24C/5/00 |

* cited by examiner

Primary Examiner—Leo Picard
Assistant Examiner—Ryan Jarrett
(74) Attorney, Agent, or Firm—Marshall, Gerstein & Borun LLP

(57) ABSTRACT

An automatic cigarette processing machine having a control unit and a number of successive work stations, each having a respective number of operating devices; for each work station, the control unit has at least one respective controller directly connected to the work station and for controlling all the operating devices at the work station substantially independently of the other controllers.

13 Claims, 2 Drawing Sheets

AUTOMATIC CIGARETTE PROCESSING MACHINE

BACKGROUND OF THE INVENTION

Automatic cigarette processing (manufacturing and/or packing) machines comprise a number of successive work stations, each for performing a sequence of operations by means of the combined action of respective operating devices. By way of example, the operating devices of a work station may comprise a product conveyor powered by a respective electric motor; a gumming device; folding members activated mechanically by the product conveyor (typically using cams) or by respective electric actuators; and a number of sensors for controlling both product quality and machine efficiency.

Known automatic cigarette processing machines comprise a central control unit for controlling the operating devices at the various work stations by means of a number of controllers, each for controlling all the machine operating devices performing the same (or similar) functions. For example, known automatic cigarette processing machines of the above type comprise a central control unit having a PLC or PC processor (so-called machine controller) for performing the machine application program and logic tasks on digital and analog signals (from the various sensors), one or more motion controllers for synchronized-motion functions, and one or more special high-speed-processing controllers.

Automatic cigarette processing machines of the above type pose several drawbacks. Using a number of controllers, each for controlling all the machine operating devices performing the same (or similar) functions, calls for a large number of electric cables along the whole length of the machine to connect each operating device to the respective controller. Moreover, testing the efficiency of each work station (e.g. when assembling the machine) is extremely difficult, on account of each controller being designed to operate simultaneously with all the work stations on the machine. Each controller operates according to a specific logic and employs a specific programming language, which are normally different from those of the other controllers (e.g. PLC's are programmed in IEC 1131-3 standard object language, whereas motion controllers are programmed in "C" language), so that control software development and testing are expensive, painstaking jobs requiring variously skilled programmers. Finally, to increase processing power, one or more of the controllers must be replaced with higher-performance models, thus resulting in relatively high updating costs.

WO0016647 discloses a cigarette manufacturing machine of the aforementioned type, i.e. comprising a central control unit for controlling the operating devices at the various work stations by means of a number of controllers, each for controlling all the machine operating devices performing the same (or similar) functions. In particular the cigarette manufacturing machine disclosed by WO0016647 comprises a tobacco rod maker for making double length tobacco rods, a tipper for applying filters to tobacco rods to form filter tipped cigarettes, and a transfer apparatus for transferring double length tobacco rods from the rod maker to the tipper. Each of the tipper and the rod maker comprises a plurality of field devices for monitoring and/or affecting parameters of the rod maker, the tipper or the cigarettes being manufactured. A motion controller controls a plurality of synchronized motors. A PC based controller controls the motion controller, the devices on the tipper and the rod maker and communicates with an HMI which is running on the same or a separate PC. The devices and the controller are linked by a field bus. The HMI PC and the motion controller are connected to the system controller either over their own links or via the fieldbus.

U.S. Pat. No. 5,787,002 discloses a control system for controlling a production facility, including a plurality of work stations each of which is provided with an automatically controllable working apparatus, has a control device for controlling the working apparatus so as to perform specified working and a data communications network through which the control means communicates data on operation of the working apparatus with other work stations so as to reflect the data in operation of each working apparatus.

DE4217473 discloses a flexible manufacturing system having a loading point for either components or raw materials and an unloading point for the finished products; components are transferred onto a loop conveyor that serves a number of workstations positioned around the outer loop and identification markings are read by local sensor and the data interpreted to select the workstation. Each workstation has a dedicated computer for control purposes and these are in communication with a host computer managing the production control.

SUMMARY OF THE INVENTION

It is an object of the present invention to provide an automatic cigarette processing machine designed to eliminate the aforementioned drawbacks, and which at the same time is cheap and easy to produce.

According to the present invention, there is provided an automatic cigarette processing machine comprising a control unit and a number of successive work stations, each having a respective number of operating devices; characterized in that, for each work station, the control unit comprises at least one respective controller directly connected to the work station and for controlling all the operating devices at the work station.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
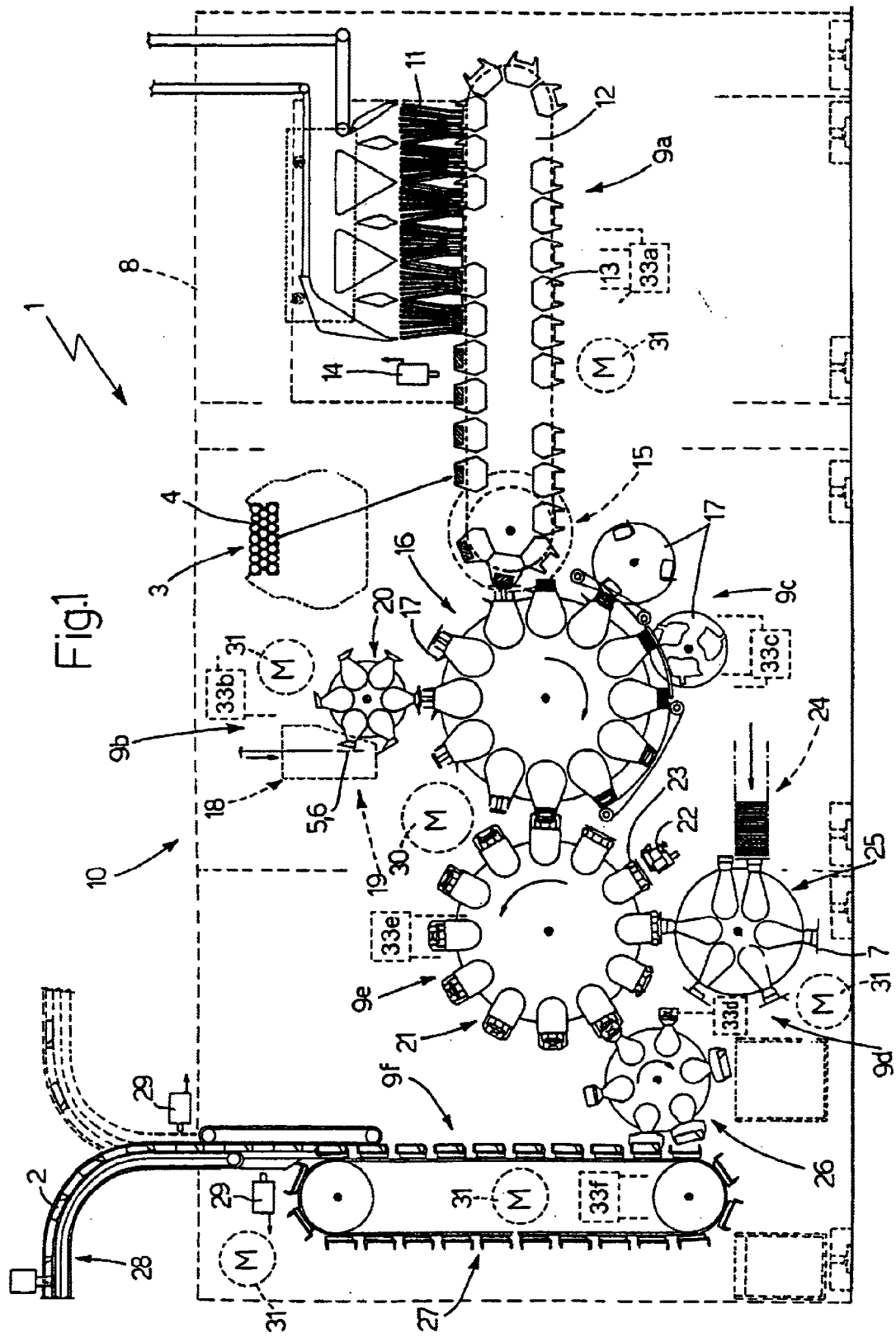
FIG. 1 shows a schematic front view of an automatic cigarette packing machine in accordance with the present invention.

Number 1 in FIG. 1 indicates as a whole an automatic cigarette processing machine for producing rigid, hinged-lid packets 2 of cigarettes. Each packet 2 comprises an orderly group 3 of cigarettes 4 wrapped in a sheet 5 of foil wrapping material; a collar 6 about group 3 and over sheet 5 of wrapping material; and a blank 7 folded about group 3.

Machine 1 is a substantially known type and comprises a frame 8 shown by the dash line in FIG. 1 and supporting a number of work stations 9, each having a respective number of operating devices 10. More specifically, machine 1 comprises six work stations 9: a station 9a for forming groups 3 of cigarettes 4; a station 9b for supplying sheets 5 of foil wrapping material and collars 6; a station 9c for folding sheets of wrapping material and collars 6 about respective groups 3; a station 9d for supplying blanks 7; a station 9e for folding blanks 7 about respective groups 3 (and over sheets 5 of wrapping material and collars 6); and a station 9f for drying packets 2.

The main operating devices 10 of each work station 9 shown in FIG. 1 will now be described by way of example, it being understood that, in actual fact, each work station 9 normally comprises a larger number of operating devices 10 (in particular, control sensors) which cannot be detailed in a schematic drawing such as FIG. 1.

Station 9a for forming groups 3 of cigarettes 4 comprises a hopper 11 for supplying cigarettes 4; a conveyor 12 having trains of pockets 13, each for receiving a respective group 3 of cigarettes 4; optical control devices 14; and a transfer wheel 15.

Station 9c for folding sheets 5 of wrapping material and collars 6 about respective groups 3 comprises a wrapping wheel 16 for receiving groups 3 from transfer wheel 15; and a number of folding members 17 carried by, or outwards of, wheel 16.

Station 9b for supplying sheets 5 of foil wrapping material and collars 6 comprises a conveyor 18; a cutting device 19; and a supply wheel 20 for feeding sheets 5 of wrapping material and collars 6 together onto wrapping wheel 16.

Station 9e for folding blanks 7 about respective groups 3 (and over sheets 5 of wrapping material and collars 6) comprises a packing wheel 21 for receiving groups 3 from wrapping wheel 16; a gumming device 22; and a number of folding members 23 carried by wheel 21.

Station 9d for supplying blanks 7 comprises a horizontal store 24 for blanks 7; and a supply wheel 25 for feeding blanks 7 onto packing wheel 21.

And finally, station 9f for drying packets 2 comprises a transfer and reject wheel 26; a drying conveyor 27; a gumming device (not shown); an output conveyor 28; and optical control devices 29.

Machine 1 also comprises a main electric motor 30 for powering wrapping and packing wheels 16 and 21 (together with respective folding members 17 and 23) and transfer wheels 15 and 26; and a number of secondary electric motors 31 for powering conveyor 12, supply wheels 20 and 25, drying conveyor 27, and output conveyor 28.

Figure 2:
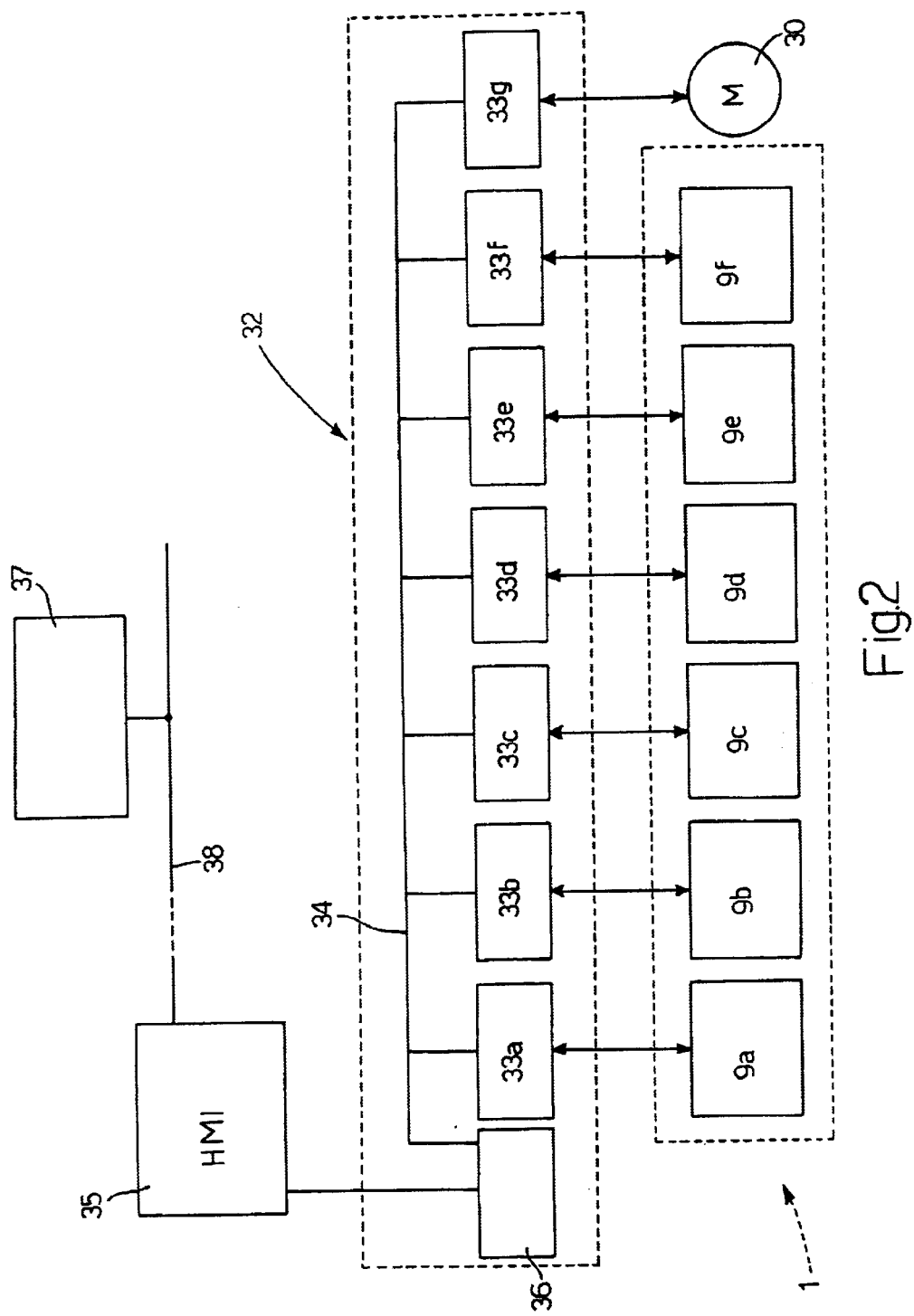
FIG. 2 shows a block diagram of a control unit of the FIG. 1 machine.

Machine 1 comprises a control unit 32 (FIG. 2) in turn comprising seven identical controllers 33 (FIG. 2) connected to one another by a local or remote BUS 34. For each work station 9a–9f, control unit 32 comprises at least one respective controller 33a–33f, which is connected directly to respective work station 9a–9f and controls all the operating devices 10 of respective work station 9a–9f substantially independently of the other controllers 33a–33f. More specifically, each controller 33a–33f controls all, and only, the operating devices 10 of the respective work station 9a–9f, and is physically located close to the respective work station 9a–9f.

In an alternative embodiment not shown, a work station 9 may be connected to two or more controllers 33, between which the tasks of controlling work station 9 are divided. This solution is used when a work station 9 calls for relatively high computing power.

Locating each controller 33a–33f physically close to the respective work station 9a–9f and connecting controllers 33 to one another by BUS 34 greatly reduce the length (and therefore cost) of the electric wiring on machine 1, by only one cable—BUS 34—extending along the whole of machine 1, and by reducing the length of the other cables connecting operating devices 10 to respective controllers 33.

Each controller 33 is a universal type programmable in a language common to all of controllers 33. More specifically, each universal controller 33 is capable of performing motion controller functions, standard PLC instructions and special logic operations, so as to be perfectly capable of controlling all the operating devices (motors, folding members, optical control devices, gumming devices, sensors . . . ) at the respective work station 9.

Control unit 32 comprises six controllers 33a–33f, each connected to a respective work station 9a–9f; and a controller 33g for controlling main electric motor 30 and coordinating starting and stopping of automatic machine 1. Main electric motor 30 supplies secondary electric motors 31 directly with a sync signal over special wiring (not shown). Physically supplying secondary electric motors 31 with the sync signal, without going along BUS 34, ensures the sync signal undergoes no transmission delays in any situation. Main electric motor 30 therefore acts as a master, while secondary electric motors 31 are controlled by main electric motor 30 as slaves.

Control unit 32 also comprises an interface device 35 (typically a personal computer), which performs the functions of an HMI interface (i.e. an interface towards a human operator) and is connected to BUS 34 by a connecting device 36 operating, for example, according to an Ethernet-type protocol. Interface device 35 is also connected to a known central control unit 37 over a network connection 38 (typically according to a Fast Ethernet-type protocol); and central control unit 37 provides for monitoring and synchronizing operation of the automatic machines in the production bay of which automatic machine 1 forms part.

Controllers 33 generally share certain control signals of automatic machine 1 over BUS 34. More specifically, each controller 33 comprises a number of known memory cells (not shown) in which are stored the values of the control signals of respective work station 9; and each controller 33 allows the other controllers 33 read/write access to certain memory cells over BUS 34.

In a preferred embodiment, to reduce overall use of BUS 341 a first controller 33 may read said memory cells of a second controller 33 on behalf of a third controller 33 with which it is to communicate.

Control unit 32 is therefore implemented by means of one type of controller 33 and is therefore programmed in one language and with one type of programming logic, thus permitting considerable time-saving advantages. Moreover, each controller 33 is designed to operate solely with one work station 9, which may therefore be tested substantially independently of the other work stations 9, with obvious advantages, for example, when assembling automatic machine 1 or performing diagnostic operations. Finally, to increase the processing power of a given work station 9, this need simply be equipped with a further controller 33 to perform some of the control functions and so reduce the work load of the existing controller 33 using scalable architecture.

What is claimed is:

1. An automatic machine (1) for processing cigarettes (4) and comprising:

a frame (8);

a plurality of work stations (9) supported by the frame (8) and arranged in succession for defining a working path of the automatic machine (1) along the frame (8), the working path being bounded by an input conveyor (11)

and an output conveyor (28); each work station (9) including a number of operating devices (10) for processing the cigarettes (4) and at least one operating device (10) in each work station (9) being a conveyor device (12, 15, 16, 18, 20, 21, 24, 25, 26, 27, 28) for feeding along said working path the cigarettes (4) or material (5, 6, 7) used for processing the cigarettes (4);

a main electric motor (30) for powering some of the conveyor devices (16, 21, 17, 23, 15, 26);

a number of secondary electric motors (31) for powering the other conveyor devices (12, 20, 25, 27, 28);

a control unit (32) comprising a plurality of first controllers (34a–33f) and at least one second controller (33g);

wherein each first controller (33a–33f) is directly connected to a respective work station (9) and controls all and only the operating devices (10) at the respective work station (9) with the exception of the conveyor devices (16, 21, 17, 23, 15, 26) powered by the main electric motor (30);

wherein the second controller (33g) controls the main electric motor (30) and coordinates starting and stopping of the machine (1);

wherein the main electric motor (30) supplies secondary electric motors (31) with a sync signal so that the main electric motor (30) therefore acts as a master, while secondary electric motors (31) are controlled by main electric motor (30) as slaves; and wherein the control unit (32) comprising a BUS connection (34) for connecting said controllers (33) to one another so as each controller (33) is in communication with at least one other controller (33).

2. The automatic cigarette processing machine of claim 1, wherein each said first controller (33a–33f) is located physically close to the respective work station (9).

3. The automatic cigarette processing machine of claim 1, wherein the main electric motor (30) supplies secondary electric motors (31) directly with a sync signal over special wiring without going along BUS (34) connection.

4. The automatic cigarette processing machine of claim 3, wherein said controllers (33) share certain control signals of the automatic cigarette processing machine (1) over said BUS (34).

5. The automatic cigarette processing machine of claim 4, wherein each controller (33) comprises a number of memory cells in which are stored the values of the control signals of the respective work station (9); each controller (33) allowing the other controllers (33) read and/or write access to certain said memory cells over said BUS (34).

6. The automatic cigarette processing machine of claim 5, wherein a first controller (33) may read said memory cells of a second controller (33) on behalf of a third controller (33) with which it is to communicate, so as reduce overall use of the BUS (34).

7. The automatic cigarette processing machine of claim 1, wherein said control unit (32) comprises an interface device (35) for performing HMI interface functions.

8. The automatic cigarette processing machine of claim 7, wherein said interface device (35) communicates with said controllers (33) by means of an Ethernet-type protocol.

9. The automatic cigarette processing machine of claim 7, wherein each controller (33) comprises a number of memory cells in which are stored the values of the control signals of the respective work station (9); said interface device (35) having read and/or write access to certain said memory cells over said BUS (34).

10. The automatic cigarette processing machine of claim 1, wherein each said controller (33) is a universal controller (33) programmable in a programming language common to all said controllers (33).

11. The automatic cigarette processing machine of claim 10, wherein each said universal controller (33) is capable of performing motion controller functions, standard PLC instructions and logic operations.

12. The automatic cigarette processing machine of claim 1, wherein said controllers (33) are all identical.

13. An automatic machine (1) for packing cigarettes (4) and comprising:

a frame (8);

a plurality of work stations (9) supported by the frame (8) and arranged in succession for defining a working path of the automatic machine (1) along the frame (8), the working path being bounded by an input conveyor (11) and an output conveyor (28); each work station (9) including a number of operating devices (10) for processing the cigarettes (4) and at least one operating device (10) in each work station (9) being a conveyor device (12, 15, 16, 18, 20, 21, 24, 25, 26, 27, 28) for feeding along said working path the cigarettes (4) or material (5, 6, 7) used for processing the cigarettes (4); a first work station (9a) comprising forming means (11) for forming groups (3) of cigarettes (4); a second work station (9c) comprising first folding means (17) for folding sheets (5) of wrapping material and collars (6) about respective groups (3) of cigarettes (4); a third work station (9c) comprising second folding means (23) for folding blanks (7) about respective groups (3) and over sheets (5) of wrapping material and collars (6);

a main electric motor (30) for powering some of the conveyor devices (16, 21, 17, 23, 15, 26);

a number of secondary electric motors (31) for powering the other conveyor devices (12, 20, 25, 27, 28);

a control unit (32) comprising a plurality of first controllers (33a–33f) and at least one second controller (33g);

wherein each first controller (33a–33f) is directly connected to a respective work station (9) and controls all and only the operating devices (10) at the respective work station (9) with the exception of the conveyor devices (16, 21, 17, 23, 15, 26) powered by the main electric motor (30);

wherein the second controller (33g) controls the main electric motor (30) and coordinates starting and stopping of the machine (1);

wherein the main electric motor (30) supplies secondary electric motors (31) with a sync signal so that the main electric motor (30) therefore acts as a master, while secondary electric motors (31) are controlled by main electric motor (30) as slaves; and wherein the control unit (32) comprising a BUS connection (34) for connecting said controllers (33) to one another so as each controller (33) is in communication with at least one other controller (33).

* * * * *

UNITED STATES PATENT AND TRADEMARK OFFICE
CERTIFICATE OF CORRECTION

PATENT NO. : 6,799,577 B2
DATED : October 5, 2004
INVENTOR(S) : Bergo et al.

It is certified that error appears in the above-identified patent and that said Letters Patent is hereby corrected as shown below:

Column 5,
Line 14, "(34a-33f)" should be -- (33a-33f) --.

Column 6,
Line 14, "(9c)" should be -- (9e) --.

Signed and Sealed this

Nineteenth Day of April, 2005

JON W. DUDAS
*Director of the United States Patent and Trademark Office*